United States Patent
Imms

(10) Patent No.: US 12,235,759 B2
(45) Date of Patent: Feb. 25, 2025

(54) POINTER-BASED SHARING OF A DATA STRUCTURE BETWEEN THREADS

(71) Applicant: Microsoft Technology Licensing, LLC, Redmond, WA (US)

(72) Inventor: Daniel John Imms, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 50 days.

(21) Appl. No.: 18/315,470

(22) Filed: May 10, 2023

(65) Prior Publication Data

US 2024/0378148 A1     Nov. 14, 2024

(51) Int. Cl.
G06F 12/06     (2006.01)

(52) U.S. Cl.
CPC .... *G06F 12/0646* (2013.01); *G06F 2212/251* (2013.01)

(58) Field of Classification Search
CPC .................................................. G06F 12/0646
See application file for complete search history.

(56) References Cited

U.S. PATENT DOCUMENTS

| | | | |
|---|---|---|---|
| 5,909,553 A | 6/1999 | Campbell et al. | |
| 5,920,703 A | 7/1999 | Campbell et al. | |
| 7,577,798 B1 | 8/2009 | Moir et al. | |
| 11,016,883 B2 | 5/2021 | Parkinson et al. | |
| 11,243,816 B2 | 2/2022 | Goossens | |
| 11,416,624 B2 | 8/2022 | Durham et al. | |
| 11,422,872 B2 | 8/2022 | Neilson et al. | |
| 2007/0067573 A1* | 3/2007 | Bruening | G06F 9/3851 711/E12.039 |
| 2015/0046758 A1* | 2/2015 | Cain, III | G06F 11/181 714/49 |
| 2015/0227414 A1 | 8/2015 | Varma | |
| 2017/0344488 A1 | 11/2017 | Sharanhovich et al. | |

(Continued)

FOREIGN PATENT DOCUMENTS

EP     1005739 B1     8/2008

OTHER PUBLICATIONS

"Multiprocessing—Process-Based Parallelism", Retrieved From: https://docs.python.org/3/library/multiprocessing.html#module-multiprocessing.sharedctypes, Retrieved Date: Nov. 15, 2022, 48 Pages.

(Continued)

*Primary Examiner* — David Yi
*Assistant Examiner* — Nicholas A. Paperno
(74) *Attorney, Agent, or Firm* — Wade IP Law PLLC

(57) ABSTRACT

Techniques are described herein that are capable of performing pointer-based sharing of a data structure between threads. A process, including first and second threads, is executed. A first memory system associated with the first thread is created to manage a first memory page that points to a shared array buffer that includes a data structure stored in contiguous memory spaces. A second memory system associated with the second thread is created to manage a second memory page that points to the shared array buffer. The second thread is configured to have access to the data structure in the shared array buffer by causing a pointer, pointing to the data structure, and a size indicator, indicating a size of the data structure, to be sent from the first thread to the second thread. The data structure is capable of being changed without being re-arranged to be contiguous in memory.

20 Claims, 12 Drawing Sheets

(56) References Cited

U.S. PATENT DOCUMENTS

2020/0104196 A1   4/2020  Ritchie et al.
2021/0240623 A1   8/2021  Das Sharma et al.

OTHER PUBLICATIONS

Carattino, Aquiles, "Handling and Sharing Data Between Threads", Retrieved From: https://www.pythonforthelab.com/blog/handling-and-sharing-data-between-threads/, Aug. 6, 2019, 14 Pages.
Lyu, Peng, "Text Buffer Reimplementation", Retrieved From: https://code.visualstudio.com/blogs/2018/03/23/text-puffer-reimplementation, Mar. 23, 2018, 8 Pages.
Anonymous: "SharedArrayBuffer—JavaScript 1 MDN", Retrieved on Sep. 27, 2024, Retrieved from URL: https://web.archive.org/web/20230424013700/https://developer.mozilla.org/en-US/docs/Web/JavaScript/Reference/Global Objects/SharedArrayBuffer, Apr. 24, 2023, pp. 1-7.
Hansen Lars: "Proposal-ecmascript-sharedmem/TUTORIAL.md at main.tc39/proposal-ecmascript-sharedmem. GitHub", Retrieved on Sep. 27, 2024, Retrieved from URL: https://web.archive.org/web/20230331175557/https://github.com/tc39/proposal-ecmascript-sharedmem/blob/main/TUTORIAL.md, Jan. 25, 2022, pp. 1-8.
International Search Report and Written Opinion received for PCT Application No. PCT/US2024/026730, Oct. 30, 2024, 17 pages.

\* cited by examiner

```
class PieceTable {
  original: string; // original contents
  added: string; // user added contents
  nodes: Node[];
} class Node {
  type: NodeType;
  start: number;
  length: number;
} enum NodeType {
  Original,
  Added
}
```

FIG. 6

```
class PieceTable {
  original: string; // original contents
  added: string; // user added contents
  nodes: Node[];
} class Node {
  type: NodeType;
  start: number;
  length: number;
  lineStarts: number[];
} enum NodeType {
  Original,
  Added
}
```

FIG. 7

```
class PieceTable {
  buffers: string[];
  nodes: Node[];
} class Node {
  bufferIndex: number;
  start: number; // start offset in buffers[bufferIndex]
  length: number;
  lineStarts: number[];
}
```

FIG. 8

```
class PieceTable {
  buffers: string[];
  rootNode: Node[];
} class Node {
  bufferIndex: number;
  start: number;
  length: number;
  lineStarts: number[];

left_subtree_length: number;
  left_subtree_lfont: number;
  left: Node;
  right: Node;
  parent: Node;
}
```

FIG. 9

```
class Buffer {
  value: string;
  lineStarts: number[];
} class BufferPosition {
  index: number; // index in Buffer.lineStarts
  remainder: number;
} class PieceTable {
  buffers: Buffer[];
  rootNode: Node;
} class Node {
  bufferIndex: number;
  start: BufferPosition;
  end: BufferPosition;
  ...
}
```

```
'''ts
TreeNode {
  left: TreeNode,
  right: TreeNode,
  value: string
}
'''
```

```
'ts
// TreeNode {
//   pointer: number,
//   getData(): string {
//     memorySystem.get(pointer)[0]
//   }
//   getLeft(): TreeNode {
//     newTreeNode(memorySystem.get(pointer)[1])
//   },
//   getRight(): TreeNode {
//     newTreeNode(memorySystem.get(pointer)[2])
//   },
// } createTreeNode(data: string) {
  var node = memorySystem.allocate(3/*length*/);
  setTreeNodeData(node, data);
  return node;
  // setTreeNodeLeft(node, left);      ◄———— 1210
  // setTreeNodeRight(node, right);    ◄———— 1212
} setTreeNodeData(pointer: number, data: string) {
  memorySystem.set(pointer)[0] = data;
}
setTreeNodeLeft(pointer: number, left: number) {
  memorySystem.set(pointer)[1] = left;
}
setTreeNodeRight(pointer: number, right: number) {
  memorySystem.set(pointer)[2] = right;
}
```

FIG. 12

```
getTreeNodeData(pointer: number) {
  return memorySystem.get(pointer)[0]    ⎫
}                                         ⎬ 1302
getTreeNoddeLeft(pionter: number) {       ⎫
  return memorySystem.get(pointer)[1]    ⎬ 1304
}
getTreeNodeRight(pointer: number) {       ⎫
  return memorySystem.get(pointer)[2]    ⎬ 1306
} root = createTreeNode('a');      ◀------ 1308
left = createTreeNode('b');      ◀------ 1310
right = createTreeNode('c');     ◀------ 1312
setTreeNodeLeft(root, left);
setTreeNodeRight(root, right);

// Send to worker:
// -root
// -pages
'''

'''ts
//View of memory page SAB
[
  data, leftpointer, rightpointer,              ◀---- 1316  ⎫
  leftdata, leftleftpointer, leftrightpointer,  ◀---- 1318  ⎬ 1314
  rightdata, rightleftpointer, rightrightpointer, ◀-- 1320  ⎭
]
'''
```

FIG. 13

```
'''ts
//WORKER ms = newMemorySystem(pages)
treePointer = root;
getTreeNodeData(root /* 0 */); //'a'
getTreeNodeData(getTreeNodeLeft(root) /* 3 */); //'b'
getTreeNodeData(getTreeNodeRight(root) /* 6 */); //'c'
```

FIG. 14

POINTER-BASED SHARING OF A DATA STRUCTURE BETWEEN THREADS

BACKGROUND

When executing a process, performing computationally intensive work on data within a single thread (a.k.a. a "main thread") of the process may cause the process to freeze. Accordingly, it may be desirable to share the data with another thread (a.k.a. a "worker thread") so that at least some of the work can be performed by the other thread. Conventional techniques for sharing data between threads involve sending all of the data from the main thread to the worker thread for processing by the worker thread. However, sending all of the data in this manner consumes a substantial amount of time and resources if an amount of the data is relatively high. Moreover, the main thread typically is locked while the data is being sent to the worker thread. After the worker thread performs the work on the data, the worker thread usually sends the data back to the main thread, which may cause the worker thread to freeze.

SUMMARY

It may be desirable to share a data structure between first and second threads without sending an entirety of the data structure from the first thread to the second thread. For instance, the first thread may use a shared array buffer to store the data structure. A shared array buffer is a binary data buffer that is capable of being used to create views on shared memory. A pointer to the data structure and an indication of a size of the data structure may be provided in lieu of content of the data structure from the first thread to the second thread. The second thread may use the pointer and the indication of the size to re-initialize the data structure in the shared array buffer.

Various approaches are described herein for, among other things, performing pointer-based sharing of a data structure between threads. Each thread of a multi-thread process has its own memory system. A memory system is capable of allocating memory into memory pages and deallocating memory from the memory pages. For example, when a thread adds a new string to a data structure, the memory system of the thread allocates memory in a memory page for the new string. In accordance with this example, when the thread deletes the new string from the data structure, the memory system of the thread deallocates the memory in the memory page. The memory system may be implemented as a class in ECMAScript, for example. Accordingly, the memory system may be characterized as a light-weight wrapper around the memory pages. A memory page is a fixed-length contiguous block of virtual memory that is described by a single entry in a page table associated with the memory page. A page table is a data structure in which an operating system stores mapping of virtual addresses of respective virtual address spaces to physical addresses of respective physical address spaces. For instance, the virtual addresses may be used by a program executed by the multi-thread process, and the physical addresses may be used by hardware, such as a random-access memory (RAM) subsystem. Each mapping of a virtual address to a physical address in the page table is referred to as a page table entry (PTE).

In an example approach, a process, which includes a first thread and a second thread, is executed. A first memory system associated with the first thread is created. The first memory system is configured to manage a first memory page that points to a shared array buffer that includes a data structure stored in contiguous memory spaces. Instead of using the first memory system and the first memory page by the second thread, a second memory system associated with the second thread is created. The second memory system is configured to manage a second memory page that points to the shared array buffer. The second thread is configured to have access to the data structure in the shared array buffer by causing a pointer, which points to the data structure, and a size indicator, which indicates a size of the data structure, to be sent in lieu of the data structure from the first thread to the second thread. The data structure is capable of being changed without being re-arranged to be contiguous in memory.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIGS. 6-10 depict example code snippets in accordance with embodiments.

FIG. 12 depicts an example code snippet for creating a tree using pointers in accordance with an embodiment.

FIG. 13 depicts an example code snippet for getting the tree that is created by the code snippet of FIG. 12 in accordance with an embodiment.

FIG. 14 depicts another example code snippet for getting the tree in accordance with an embodiment.

Figure 1:
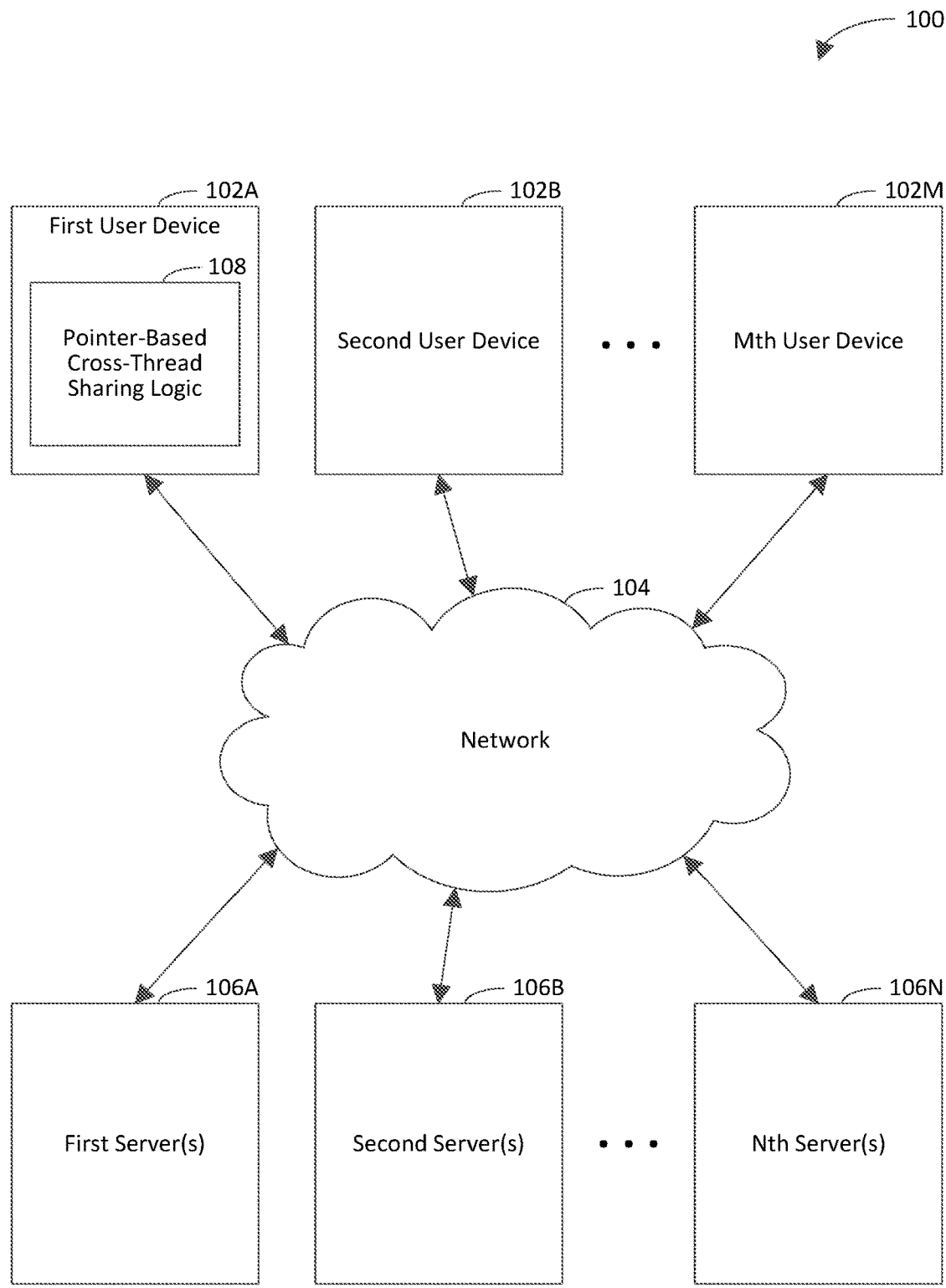
FIG. 1 is a block diagram of an example pointer-based cross-thread sharing system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or

DETAILED DESCRIPTION

I. Example Embodiments

It may be desirable to share a data structure between first and second threads without sending an entirety of the data structure from the first thread to the second thread. For instance, the first thread may use a shared array buffer to store the data structure. A shared array buffer is a binary data buffer that is capable of being used to create views on shared memory. A pointer to the data structure and an indication of a size of the data structure may be provided in lieu of content of the data structure from the first thread to the second thread. The second thread may use the pointer and the indication of the size to re-initialize the data structure in the shared array buffer.

Example embodiments described herein are capable of performing pointer-based sharing of a data structure between threads. Each thread of a multi-thread process has its own memory system. A memory system is capable of allocating memory into memory pages and deallocating memory from the memory pages. For example, when a thread adds a new string to a data structure, the memory system of the thread allocates memory in a memory page for the new string. In accordance with this example, when the thread deletes the new string from the data structure, the memory system of the thread deallocates the memory in the memory page. The memory system may be implemented as a class in ECMAScript, for example. Accordingly, the memory system may be characterized as a light-weight wrapper around the memory pages. A memory page is a fixed-length contiguous block of virtual memory that is described by a single entry in a page table associated with the memory page. A page table is a data structure in which an operating system stores mapping of virtual addresses of respective virtual address spaces to physical addresses of respective physical address spaces. For instance, the virtual addresses may be used by a program executed by the multi-thread process, and the physical addresses may be used by hardware, such as a random-access memory (RAM) subsystem. Each mapping of a virtual address to a physical address in the page table is referred to as a page table entry (PTE).

Example techniques described herein have a variety of benefits as compared to conventional techniques for sharing data between threads. For instance, the example techniques are capable of reducing an amount of data that is sent between the threads by causing a pointer, which points to a data structure, and an indication of a size of the data structure, rather than the data structure itself, to be sent between the threads. The example techniques may eliminate a need to lock a thread when the thread shares the data structure with another thread. The example techniques may inhibit (e.g., prevent) a process that includes the threads from freezing or reduce an amount of time that the process freezes when the data structure is shared between the threads. For instance, the example techniques may prevent the process from freezing for more than 16 milliseconds, which may ensure that a frame rate of at least 60 frames per second is maintained. The example techniques enable a main thread to store data structures, which correspond to respective nodes of a tree, in respective shared array buffers that are referenced by respective memory pages of the main thread and further enable a worker thread to re-initialize the data structures. By enabling the worker thread to re-initialize the data structures, the example techniques enable the worker thread to access the data structures, which may enable the worker thread to perform work on the data structures on behalf of the main thread.

The example techniques may reduce an amount of time and/or resources (e.g., processor cycles, memory, network bandwidth) that is consumed to share data between threads. For instance, by causing a pointer, which points to a data structure, and a size indicator, which indicates a size of the data structure, to be sent in lieu of the data structure from a first thread to a second thread, the example techniques may enable a computing system that executes a process, which includes the first and second threads, to avoid consuming time and/or resources that would have been consumed by sending the data structure from the first thread to the second thread. By reducing the amount of time and/or resources that is consumed by the computing system, the efficiency of the computing system may be increased and/or a cost associated with executing the process may be reduced.

A user experience of a user who uses a computer program executed by the process may be increased, for example, by reducing an amount of time that the computer program freezes during execution. For instance, the amount of time that the computer program freezes may be reduced to a duration that is not capable of being perceived through unaided visual perception of the user.

FIG. 1 is a block diagram of an example pointer-based cross-thread sharing system 100 in accordance with an embodiment. Generally speaking, the pointer-based cross-thread sharing system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the pointer-based cross-thread sharing system 100 performs pointer-based sharing of a data structure between threads. Detail regarding techniques for performing pointer-based sharing of a data structure between threads is provided in the following discussion.

As shown in FIG. 1, the pointer-based cross-thread sharing system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are computing systems that are capable of communicating with servers 106A-106N. A computing system is a system that includes a processing system comprising at least one processor that is capable of manipulating data in accordance with a set of instructions. For instance, a computing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-

102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The first user device 102A is shown to include pointer-based cross-thread sharing logic 108 for illustrative purposes. The pointer-based cross-thread sharing logic 108 is configured to perform pointer-based sharing of a data structure between threads. In an example implementation, the pointer-based cross-thread sharing logic 108 executes a process that includes a first thread and a second thread. The pointer-based cross-thread sharing logic 108 creates a first memory system associated with the first thread. The first memory system is configured to manage a first memory page that points to a shared array buffer that includes a data structure stored in contiguous memory spaces. Instead of the second thread using the first memory system and the first memory page, the pointer-based cross-thread sharing logic 108 creates a second memory system associated with the second thread. The second memory system is configured to manage a second memory page that points to the shared array buffer. The pointer-based cross-thread sharing logic 108 configures the second thread to have access to the data structure in the shared array buffer by causing a pointer, which points to the data structure, and a size indicator, which indicates a size of the data structure, to be sent in lieu of the data structure from the first thread to the second thread. The data structure is capable of being changed without being re-arranged to be contiguous in memory. For example, the pointer-based cross-thread sharing logic 108 may determine that a modification to the data structure results in the data structure being stored in non-contiguous memory spaces. For instance, the modification to the data structure may include adding a string to the data structure and/or deleting a string from the data structure. In accordance with this example, the pointer-based cross-thread sharing logic 108 may maintain storage of the data structure in the non-contiguous memory spaces, for example, by refraining from re-arranging the data structure to be stored in contiguous memory spaces.

The servers 106A-106N are computing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. In accordance with some example embodiments, the servers 106A-106N are configured to host respective Web sites, so that the Web sites are accessible to users of the instrumentation-based complexity detection system 100.

The pointer-based cross-thread sharing logic 108 may be implemented in various ways to perform pointer-based sharing of a data structure between threads, including being implemented in hardware, software, firmware, or any combination thereof. For example, the pointer-based cross-thread sharing logic 108 may be implemented as computer program code configured to be executed in one or more processors. In another example, at least a portion of the pointer-based cross-thread sharing logic 108 may be implemented as hardware logic/electrical circuitry. For instance, at least a portion of the pointer-based cross-thread sharing logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

It will be recognized that the pointer-based cross-thread sharing logic 108 may be (or may be included in) a web browser or a developer tool, though the scope of the example embodiments is not limited in this respect. A web browser is a computer program (e.g., application) that enables access to websites. Examples of a web browser include but are not limited to Microsoft Edge® and Internet Explorer®, developed and distributed by Microsoft Corporation; Google Chrome®, developed and distributed by Google LLC; Safari™, developed and distributed by Apple Inc.; Firefox®, developed and distributed by Mozilla Foundation; and Opera™, developed and distributed by Opera Software ASA.

A developer tool is a computer program that performs diagnostic operations (e.g., identifying source of problem, debugging, profiling, controlling, etc.) with respect to program code. Examples of a developer tool include but are not limited to an integrated development environment (IDE) and a web development platform. Examples of an IDE include but are not limited to Microsoft Visual Studio® IDE developed and distributed by Microsoft Corporation; AppCode® IDE, PhpStorm® IDE, Rider® IDE, WebStorm® IDE, etc. developed and distributed by JetBrains s.r.o.; JDeveloper® IDE developed and distributed by Oracle International Corporation; NetBeans® IDE developed and distributed by Sun Microsystems, Inc.; Eclipse™ IDE developed and distributed by Eclipse Foundation; and Android Studio™ IDE developed and distributed by Google LLC and JetBrains s.r.o. Examples of a web development platform include but are not limited to Windows Azure® platform developed and distributed by Microsoft Corporation; Amazon Web Services® platform developed and distributed by Amazon.com, Inc.; Google App Engine® platform developed and distributed by Google LLC; VMWare® platform developed and distributed by VMWare, Inc.; and Force.com® platform developed and distributed by Salesforce, Inc. It will be recognized that the example techniques described herein may be implemented using a web browser or a developer tool.

The pointer-based cross-thread sharing logic 108 is shown to be incorporated in the first user device 102A for illustrative purposes and is not intended to be limiting. It will be recognized that the pointer-based cross-thread sharing logic 108 (or any portion(s) thereof) may be incorporated in any one or more of the servers 106A-106N, any one or more of the user devices 102A-102M, or any combination thereof. For example, client-side aspects of the pointer-based cross-thread sharing logic 108 may be incorporated in one or more of the user devices 102A-102M, and server-side aspects of pointer-based cross-thread sharing logic 108 may be incorporated in one or more of the servers 106A-106N.

Figure 2:
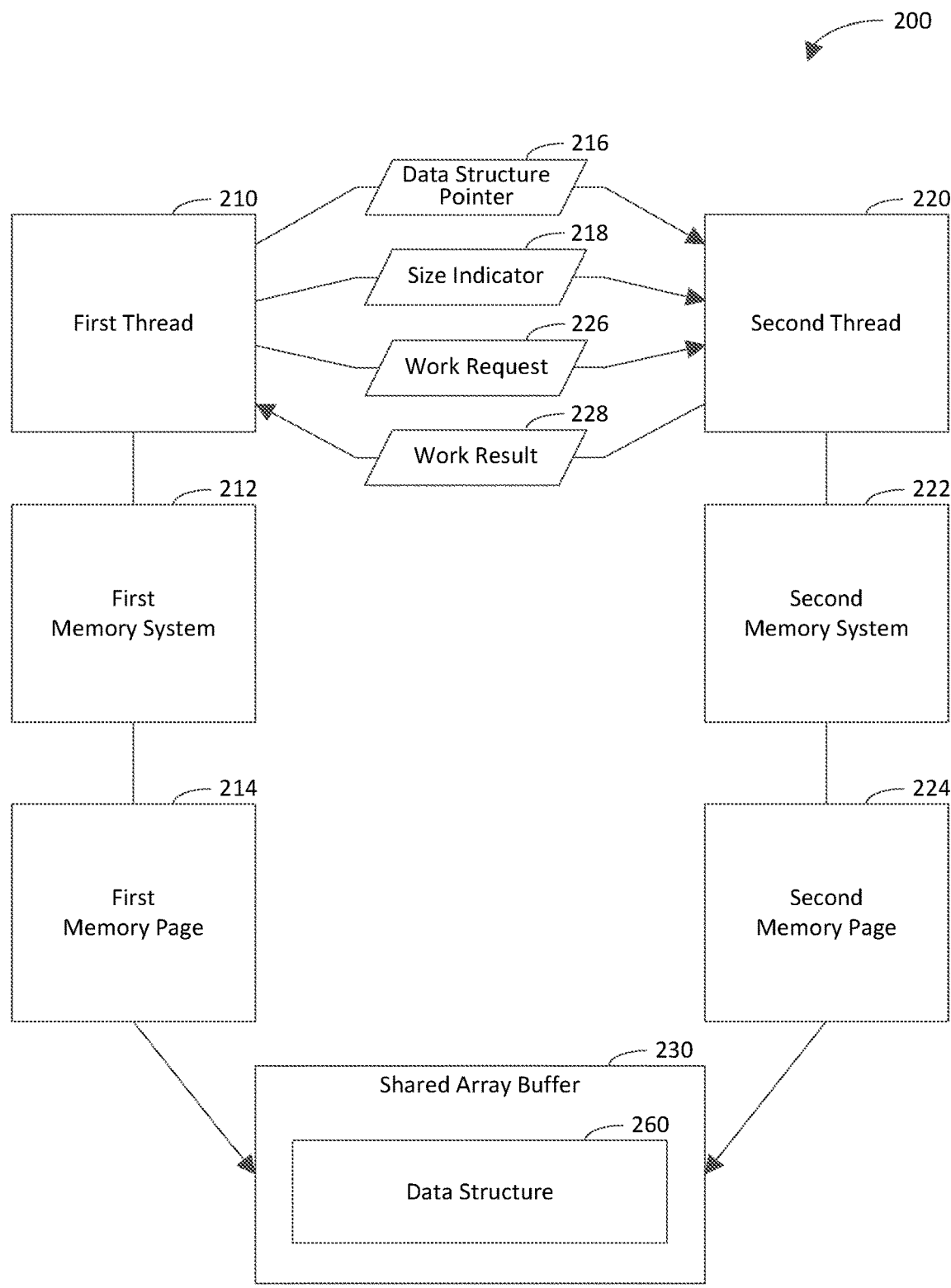
FIG. 2 is a block diagram of an example multi-thread process in accordance with an embodiment.

FIG. 2 is a block diagram of an example multi-thread process 200 in accordance with an embodiment. The process 200 includes a first thread 210 and a second thread 220. The first thread 210 and the second thread 220 share access to a shared array buffer 230. The first thread 201 has a first memory system 212, which is configured to manage a first memory page 214. The first memory page 214 points to the shared array buffer 230, which includes a data structure 260. The second thread 220 has a second memory system 222, which is configured to manage a second memory page 224. The second memory page 224 points to the shared array buffer 230.

Assume that the first thread is scheduled to perform primary operations, which have a relatively high priority, and secondary operations, which have a relatively low priority, with regard to the data structure 260. It may be desirable for the first thread 210 to share the data structure 260 with the second thread 220 so that the second thread 220 may perform the secondary operations with regard to the data structure 260 on behalf of the first thread 210. By having the second thread 220 perform the secondary operations on behalf of the first thread 210, the first thread 210 may focus its time and resources on performing the primary operations. Although the second thread 220 has access to the shared array buffer 230, the second thread 220 initially is unaware of the data structure 260 that is stored in the shared array buffer 230. Because the second thread 220 initially is unaware of the data structure 260 in the shared array buffer 230, the second thread 220 initially is unable to access the data structure 260.

To enable the second thread 220 to access the data structure 260, the first thread 210 sends a data structure pointer 216 and a size indicator 218 to the second thread 220. The data structure pointer 216 points to the data structure 260. For instance, the data structure pointer 216 may identify a memory address at which the first byte of the data structure 260 is stored. The size indicator 218 indicates a size of the data structure 260. For instance, the size may be a number of bytes that are included in the data structure 260. It should be noted that the data structure 260 is stored in contiguous memory spaces in the shared array buffer 230. Thus, by knowing the memory address at which the first byte of the data structure 260 is stored and the size of the data structure 260, the second thread 220 may access the data structure 260 in the shared array buffer 230. Accordingly, the first thread 210 sending the data structure pointer 216 and the size indicator 218 to the second thread 220 is said to configure the second thread 220 to have access to the data structure 260 in the shared array buffer 230.

After configuring the second thread 220 to access the data structure 260 in the shared array buffer 230, the first thread 210 may send a work request 226 to the second thread 220. The work request 226 requests that the second thread 220 perform the secondary operations on behalf of the first thread 210. As a result of receiving the work request 226, the second thread 220 performs the secondary operations on behalf of the first thread 210. Performing the secondary operations provides a work result 228. In an example embodiment, performing the secondary operations identifies attribute(s) of the data structure 260, and the work result 228 includes information that describes the attribute(s). In another example embodiment, performing the operations modifies the data structure 260, and the work result 228 includes a modified version of the data structure 260. The second thread 220 sends the work result 228 to the first thread 210 in satisfaction of the work request 226.

Figure 3:
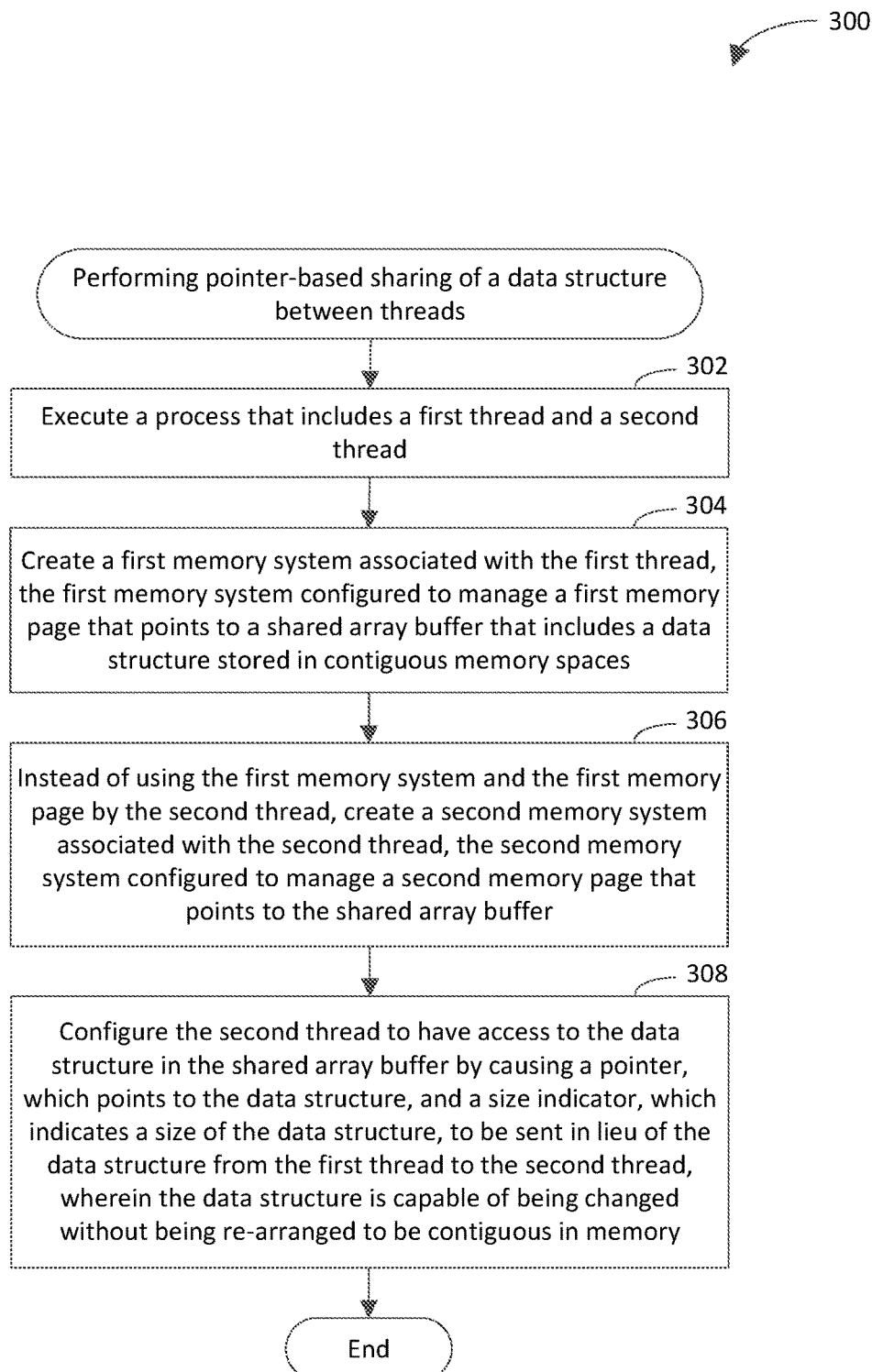
FIGS. 3-4 depict flowcharts of example methods for performing pointer-based sharing of a data structure between threads in accordance with embodiments.
Figure 4:
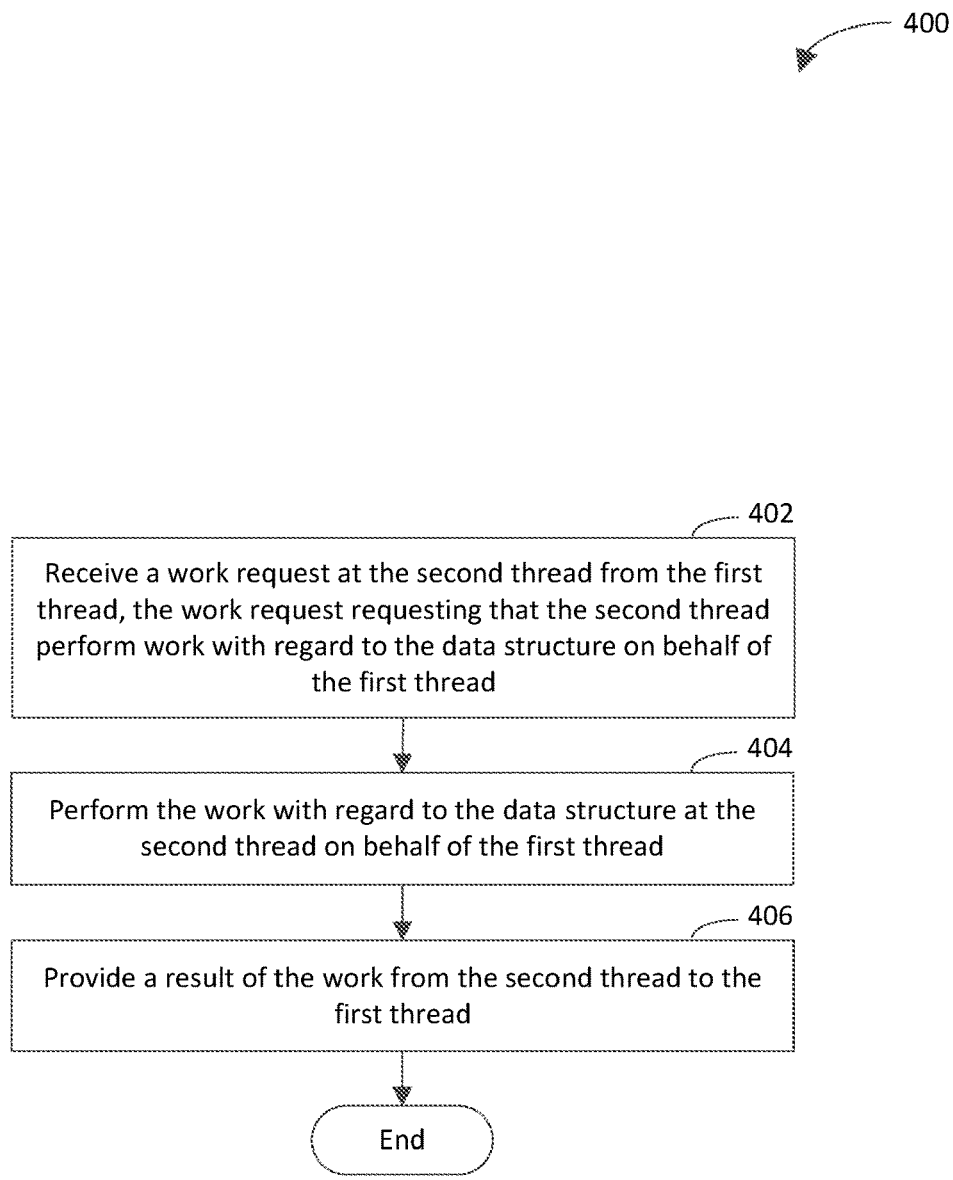
Figure 5:
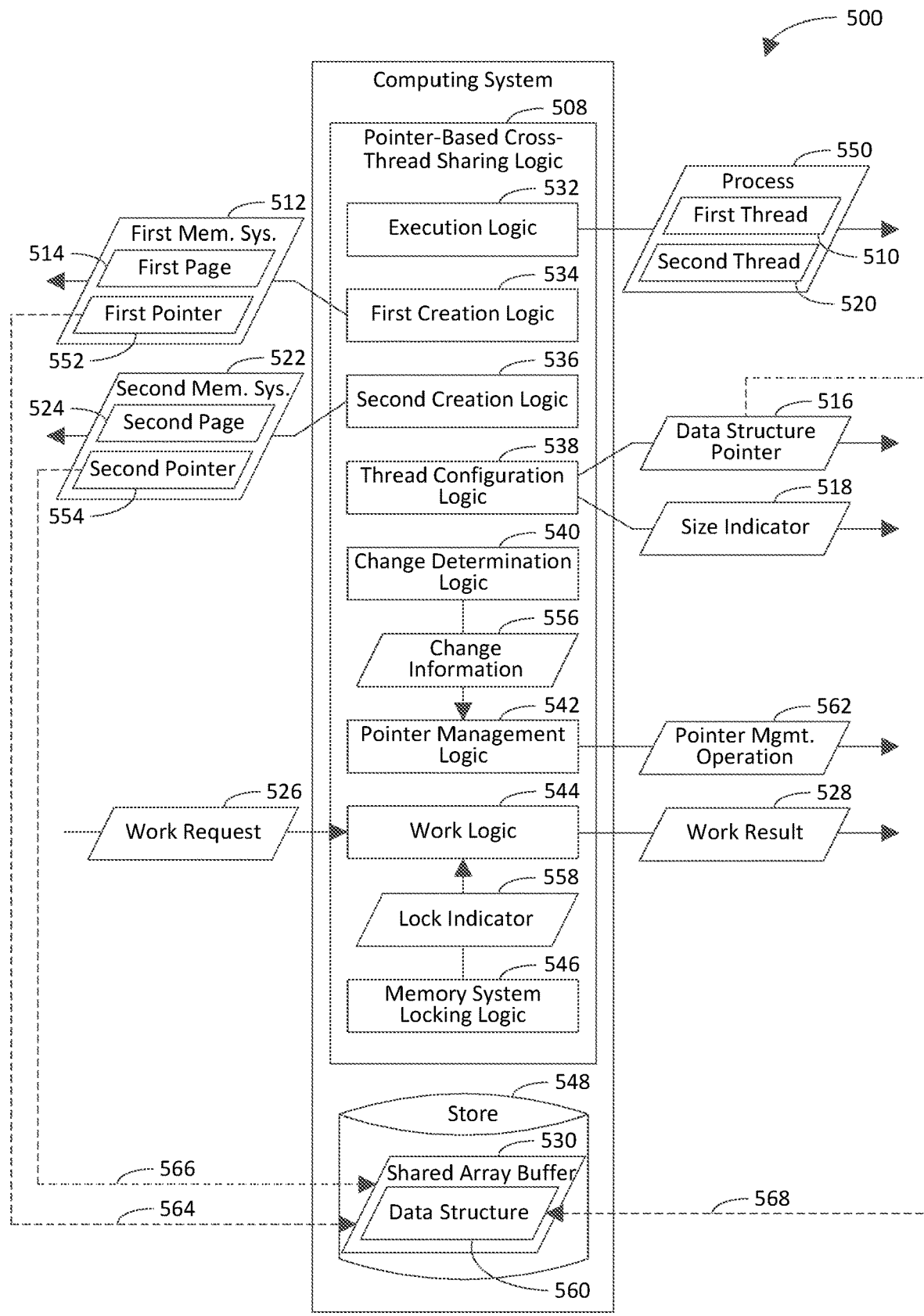
FIG. 5 is a block diagram of an example computing system in accordance with an embodiment.

FIGS. 3-4 depict flowcharts 300 and 400 of example methods for performing pointer-based sharing of a data structure between threads in accordance with embodiments. Flowcharts 300 and 400 may be performed by the first user device 102A shown in FIG. 1, for example. For illustrative purposes, flowcharts 300 and 400 are described with respect to computing system 500 shown in FIG. 5, which is an example implementation of the first user device 102A. As shown in FIG. 5, the computing system 500 includes pointer-based cross-thread sharing logic 508 and a store 548. The pointer-based cross-thread sharing logic 508 includes execution logic 532, first creation logic 534, second creation logic 536, thread configuration logic 538, change determination logic 540, pointer management logic 542, work logic 544, and memory system locking logic 546. The store 548 may be any suitable type of store. One type of store is a database. For instance, the store 548 may be a relational database, an entity-relationship database, an object database, an object relational database, an extensible markup language (XML) database, etc. The store 548 is shown to store a shared array buffer 530, which includes a data structure 560, for non-limiting, illustrative purposes. Further structural and operational embodiments will be apparent to persons skilled in the relevant art(s) based on the discussion regarding flowcharts 300 and 400.

As shown in FIG. 3, the method of flowchart 300 begins at step 302. In step 302, a process, which includes a first thread and a second thread, is executed. For instance, the first thread may be a main thread, and the second thread may be a worker thread. A main thread is a thread that requests that another thread (a.k.a. a worker thread) perform an operation on behalf of the main thread. A worker thread is a thread that performs an operation on behalf of another thread (a.k.a. a main thread). In an example embodiment, the worker thread is assigned only to an active request and is released as a result of the request being serviced. In accordance with this embodiment, the worker thread may be released as a result of the request being serviced even if a user session during which the request was made or a connection on which the request was made remains open. In another example embodiment, the process is executed at step 302 in context of a web browser. In yet another example embodiment, the process is executed at step 302 in context of a node.js environment. Node.js is a cross-platform, open source server environment that is configured to execute JavaScript® code outside a web browser. In an example implementation, the execution logic 532 executes a process 550, which includes a first thread 510 and a second thread 520.

In an example embodiment, the process is executed at step 302 in an ECMAScript runtime. An ECMAScript runtime is a runtime that executes ECMAScript code. For instance, the ECMAScript runtime may provide ECMAScript application programming interfaces (APIs) for input/output (I/O) operations. ECMAScript code is code that conforms to the ECMAScript standard, which is a scripting-language specification developed and maintained by Ecma International in ECMA-262 and ISO/IEC 16262. Example implementations of ECMAScript include but are not limited to JavaScript®, Jscript®, and ActionScript®.

At step 304, a first memory system associated with the first thread is created (e.g., instantiated). The first memory system is configured to manage a first memory page that points to a shared array buffer. The shared array buffer includes a data structure stored in contiguous memory spaces. In an example embodiment, the first memory system is a light-weight wrapper around the first memory page. In another example embodiment, the first memory system is capable of allocating and deallocating memory spaces of arbitrary size for objects in the data structure. In yet another example embodiment, the first memory system is specific to the first thread. In accordance with this embodiment, the first memory system is not usable by threads other than the first thread. In still another example embodiment, the contiguous memory spaces include first contiguous memory spaces followed by second contiguous memory spaces. In a first aspect of this embodiment, the first contiguous memory spaces are allocated for content of the data structure, and the second contiguous memory spaces are designated to store metadata associated with the data structure. In a second aspect of this embodiment, the first contiguous memory spaces are designated to store metadata associated with the data structure, and the second contiguous memory spaces are allocated for content of the data structure.

In an example implementation, the first creation logic 534 creates a first memory system 512 associated with the first thread 510. For instance, the first creation logic 534 may execute in the context of the first thread 510. The first memory system 512 is configured to manage a first memory page (a.k.a. "first page") 514. The first memory page 514 has a first pointer 552, which points to the shared array buffer 530, as indicated by dashed arrow 564. The shared array buffer 530 includes a data structure 560, which is stored in contiguous memory spaces.

At step 306, instead of using the first memory system and the first memory page by the second thread, a second memory system associated with the second thread is created (e.g., instantiated). The second memory system is configured to manage a second memory page that points to the shared array buffer. In an example embodiment, the second memory system is a light-weight wrapper around the second memory page. In another example embodiment, the second memory system is capable of allocating and deallocating memory spaces of arbitrary size for objects in the data structure. In yet another example embodiment, the second memory system is specific to the second thread. In accordance with this embodiment, the second memory system is not usable by threads other than the second thread. In an example implementation, the second creation logic 536 creates a second memory system 522 associated with the second thread 520. For instance, the second creation logic 536 may execute in the context of the second thread 520. The second memory system 522 is configured to manage a second memory page (a.k.a. "second page") 524. The second memory page 524 has a second pointer 554, which points to the shared array buffer 530, as indicated by dashed arrow 566.

At step 308, the second thread is configured to have access to the data structure in the shared array buffer by causing a pointer, which points to the data structure, and a size indicator, which indicates a size of the data structure, to be sent in lieu of the data structure (e.g., in lieu of content of the data structure) from the first thread to the second thread. For instance, the size of the data structure may be a number of memory spaces that are allocated for storage of the data structure in the shared array buffer. The data structure is capable of being changed without being re-arranged to be contiguous in memory. In an aspect, the data structure includes portions A, B, and C stored in the contiguous memory spaces. In a first example of this aspect, portion B of the data structure is deleted from its corresponding memory space, resulting in the data structure being stored in the non-contiguous memory spaces corresponding to portions A and C. In accordance with the first example, the data structure is not re-arranged to cause portions A and C of the data structure to be stored in contiguous memory spaces. For instance, neither portion A nor portion C is relocated to the memory space in which portion B was stored before being deleted. In a second example of this aspect, a string, which is stored in a memory space that is not contiguous with the memory spaces in which portions A, B, and C are stored, is added to the data structure. In accordance with the second example, the data structure is not re-arranged to cause the string to be stored in a memory space that is contiguous with the contiguous memory spaces in which portions A, B, and C are stored.

In an example embodiment, the pointer enables the second memory system associated with the second thread to locate an index on the second memory page. In accordance with this embodiment, the index corresponds to the contiguous memory spaces in which the data structure is stored.

In another example embodiment, the shared array buffer includes a tree data structure stored in the contiguous memory spaces. A tree data structure is a hierarchical data structure that includes multiple data elements (a.k.a. nodes). Each node of the tree data structure is capable of being connected to any suitable number (e.g., 0, 1, 2, 3, . . . ) of child nodes and is connected to exactly one parent node, except that a root node of the tree data structure has no parent (and therefore is not connected to a parent node). In accordance with this embodiment, configuring the second thread to have access to the data structure at step 308 includes configuring the second thread to have access to the tree data structure in the shared array buffer by causing the pointer, which points to the tree data structure, and the size indicator, which indicates the size of the tree data structure, to be sent in lieu of the tree data structure from the first thread to the second thread.

In yet another example embodiment, the shared array buffer includes a piece tree stored in the contiguous memory spaces. A piece tree is a multi-buffer piece table with a self-balancing binary search tree (e.g., a red-black tree) that is optimized for a line model. In accordance with this embodiment, configuring the second thread to have access to the data structure at step 308 includes configuring the second thread to have access to the piece tree in the shared array buffer by causing the pointer, which points to the piece tree, and the size indicator, which indicates the size of the piece tree, to be sent in lieu of the piece tree from the first thread to the second thread.

In still another example embodiment, the shared array buffer includes a linked list stored in the contiguous memory spaces. A linked list is a collection of data elements that represent a sequence. A physical ordering of the data elements in the contiguous memory spaces does not necessarily represent an order of the data elements in the sequence. Rather, each data element in the sequence (except for the last data element in the sequence) references (e.g., links to) a next data element in the sequence. In accordance with this embodiment, configuring the second thread to have access to the data structure at step 308 includes configuring the second thread to have access to the linked list in the shared array buffer by causing the pointer, which points to the linked list, and the size indicator, which indicates the size of the linked list, to be sent in lieu of the linked list from the first thread to the second thread.

In an example implementation, the thread configuration logic 538 configures the second thread 520 to have access to the data structure 560 in the shared array buffer 530 by causing a data structure pointer 516 and a size indicator 518 to be sent in lieu of the data structure 560 from the first thread 510 to the second thread 520. For instance, the thread configuration logic 538 may execute in the context of the first thread 510. The data structure pointer 516 points to the data structure 560 in the shared array buffer 530, as indicated by dashed arrow 568. The size indicator 518 indicates a size of the data structure 560.

In an example embodiment, creating the first memory system at step 304 includes creating the first memory system as a first class in a JavaScript® programming language. In accordance with this embodiment, creating the second memory system at step 306 includes creating the second memory system as a second class in the JavaScript® programming language.

In some example embodiments, one or more steps 302, 304, 306, and/or 308 of flowchart 300 may not be performed. Moreover, steps in addition to or in lieu of steps 302, 304, 306, and/or 308 may be performed. For instance, in an example embodiment, configuring the second thread to have access to the data structure at step 308 includes causing a multiple pointers, which point to respective portions (e.g., strings or characters) of the data structure, and multiple size indicators, which indicate respective sizes of the respective portions of the data structure, to be sent in lieu of the data structure from the first thread to the second thread. In accordance with this embodiment, the method of flowchart 300 further includes determining that the first thread deletes an identified portion from the portions in the data structure. In an example implementation, the change determination logic 540 determines that the first thread 510 deletes an identified portion from the portions in the data structure 560. The change determination logic 540 generates change information 556 to indicate that the identified portion has been deleted from the portions in the data structure 560. In further accordance with this embodiment, the method of flowchart 300 further includes, based at least on a determination that the first thread deletes the identified portion of the data structure, deleting an identified pointer, which points to the identified portion of the data structure, from the pointers. In an example implementation, the pointer management logic 542 deletes an identified pointer, which points to the identified portion of the data structure 560, from the pointers based at least on a determination that the first thread 510 has deleted the identified portion of the data structure 560. For instance, the pointer management logic 542 may perform a pointer management operations 562, which includes deleting the identified pointer, based at least on receipt of the change information 556 (e.g., based at least on the change information 556 indicating that the identified portion has been deleted from the portions in the data structure 560).

In an aspect of this embodiment, the method of flowchart 300 further includes determining that the first thread adds a string to the data structure in a memory space from which the identified portion of the data structure was deleted. In an example implementation, the change determination logic 540 determines that the first thread 510 adds a string to the data structure 560 in a memory space from which the identified portion of the data structure 560 was deleted. The change determination logic 540 configures the change information 556 to indicate that the first thread 510 has added a string to the data structure 560 in the memory space from which the identified portion of the data structure 560 was deleted. In accordance with this embodiment, the method of flowchart 300 further includes, based at least on a determination that the first thread adds the string to the data structure in the memory space, generating a new pointer that points to the string in the memory space. In an example implementation, based at least on a determination that the first thread 510 adds the string to the data structure 560 in the memory space, the pointer management logic 542 generates the new pointer, which points to the string in the memory space. For instance, the pointer management logic 542 may perform the pointer management operations 562, which includes generating the new pointer, based at least on receipt of the change information 556 (e.g., based at least on the change information 556 indicating that the first thread 510 has added the string to the data structure 560 in the memory space from which the identified portion of the data structure 560 was deleted).

In another example embodiment, the method of flowchart 300 further includes one or more of the steps shown in flowchart 400 of FIG. 4. As shown in FIG. 4, the method of flowchart 400 begins at step 402. In step 402, a work request is received at the second thread from the first thread. The work request requests that the second thread perform work with regard to the data structure on behalf of the first thread. In an example implementation, the work logic 544, which executes in the context of the second thread 520, receives a work request 526 from the first thread 510. The work request 526 requests that the second thread 520 perform work with regard to the data structure 560 on behalf of the first thread 510.

At step 404, the work is performed with regard to the data structure at the second thread on behalf of the first thread. In an example implementation, the work logic 544 performs the work with regard to the data structure 560 on behalf of the first thread 510.

At step 406, a result of the work is provided from the second thread to the first thread. In an example implementation, the work logic 544 provides a work result 528, which is the result of the work, to the first thread 510.

In a first aspect of this embodiment, performing the work at step 404 includes modifying the data structure by the second thread on behalf of the first thread to provide (e.g., generate) a modified data structure. For instance, the data structure may be tokenized by the second thread to provide a tokenized data structure. In an aspect, tokenization of the data structure includes adding colors to text in the data structure. In an example implementation, the work logic 544 modifies the data structure 560 on behalf of the first thread 510 to provide the modified data structure. In accordance with this aspect, providing the result of the work at step 406 includes providing a representation of the modified data structure from the second thread to the first thread. For example, the representation of the modified data structure may include (e.g., may be) a pointer to the modified data structure. In another example, the representation of the modified data structure may include (e.g., may be) an entirety of the modified data structure or a portion of the modified data structure that was modified. In an example implementation, the work logic 544 provides the work result 528, which includes the representation of the modified data structure, to the first thread 510.

In an example of the first aspect, the method of flowchart 400 further includes locking the first memory system associated with the first thread. In an example implementation, the memory system locking logic 546 locks the first memory system 512 associated with the first thread 510. The memory system locking logic 546 generates a lock indicator 558 to indicate that the first memory system 512 is locked. In accordance with this example, modifying the data structure by the second thread is performed in response to (e.g., based at least on) the first memory system associated with the first thread being locked. In an example implementation, the work logic 544 modifies the data structure 560 in response to receipt of the lock indicator 558 (e.g., in response to the lock indicator 558 indicating that the first memory system 512 has been locked).

In a second aspect of this embodiment, performing the work at step 404 includes determining an attribute of the data structure at the second thread on behalf of the first thread by analyzing the data structure. For instance, the attribute may be a link that is included in the data structure. A link in the data structure may be any suitable type of link, including but not limited to a hypertext markup language (HTML) link. In an example implementation, the work logic 544 determines an attribute of the data structure 560 on behalf of the first thread 510 by analyzing the data structure 560. In accordance with this aspect, providing the result of the work at step 406 includes providing information, which specifies the attribute of the data structure, from the second thread to the first thread. In an example implementation, the work logic 544 provides the work result 528, which includes information that specifies the attribute of the data structure 560, to the first thread 510.

It will be recognized that the computing system 500 may not include one or more of the pointer-based cross-thread sharing logic 508, the execution logic 532, the first creation logic 534, the second creation logic 536, the thread configuration logic 538, the change determination logic 540, the pointer management logic 542, the work logic 544, the memory system locking logic 546, and/or the store 548. Furthermore, the computing system 500 may include components in addition to or in lieu of the pointer-based cross-thread sharing logic 508, the execution logic 532, the first creation logic 534, the second creation logic 536, the thread configuration logic 538, the change determination logic 540, the pointer management logic 542, the work logic 544, the memory system locking logic 546, and/or the store 548.

A piece tree is mentioned above as one example type of a data structure that may be shared between threads. Attributes of the piece tree and motivation for using the piece tree to represent a file will now be described in further detail. To provide context, a line-based model for a text editor will be described. By using the line-based model, developers may read and write source code line-by-line; compilers may provide line- and column-based diagnostics; stack traces may contain line numbers; tokenization engines may run line-by-line, and so on. Using an array of lines to represent a file may work efficiently for relatively small text documents. For instance, when a user is typing, the line to be modified in the array is located and replaced. When inserting a new line, a new line object may be spliced into the array, and an ECMAScript engine may perform the relevant processing. In the line-based model, an object is created for each line in the array, causing the amount of memory consumed by the array to be proportional to the sum of the amounts consumed by the respective objects. For relatively large text documents (i.e., text documents having a substantial number of lines), the array may consume an amount of memory that is many times (e.g., twenty times) the initial file size to store the file due to each object using a substantial amount of memory (e.g., 40-60 bytes). To reduce the amount of memory that is consumed to store a representation of the file, it may be desirable to reduce the amount of metadata associated with the file. A piece table may be used to achieve this end.

FIG. 6 is an example code snippet 600 that defines a piece table in accordance with an embodiment. The piece table may be used to represent a series of edits on a text document. After the text document is initially loaded, the piece table contains the whole contents of the text document in the original field. The added field is empty. As shown in FIG. 6, there is a single node of type NodeType.Original. When a user types at the end of the text document, the new content is appended to the added field, and the new node of type NodeType.Added is inserted at the end of the node list. Similarly, when a user makes edits in the middle of a node, the node is split, and a new node is inserted as needed.

The initial memory usage of the piece table is relatively close to the size of the text document, and the memory needed for modifications is proportional to the number of edits and text added. Accordingly, the piece table may use memory relatively efficiently. The tradeoff for low memory usage may be that accessing a logical line using a traditional piece table is slower, as compared to the line-based model. For instance, to access content of the $1000^{th}$ line of the file using a traditional piece table, iteration is performed over every character starting at the beginning of the text document to find the first 999 line breaks and to read each character until the next line break. However, the traditional piece table may be modified to store an offset for each line break in a node's text to achieve faster line lookup.

FIG. 7 is an example code snippet 700 that defines a piece table, which has been modified to store an offset for each line break in a node's text, in accordance with an embodiment. For instance, if a user wants to access the second line in a given Node instance, node.lineStarts[0] and node.lineStarts[1] may be read to determine the relative offsets at which a line begins and ends. The number of line breaks that a node has is known. Thus, accessing an arbitrary line in the text document is relatively straight-forward: each node starting from the first node is read until the target line break is identified. By using the modified piece table, it is possible to jump over entire chunks of text, rather than iterating character-by-character.

The modified piece table defined by the code snippet 700 in FIG. 7 holds two buffers: a first buffer for original content loaded from disk and a second buffer for user edits. The text document may be received in chunks, and the chunks can be concatenated into one large string and stored in the original field of the piece table. To reduce a size of any single string (e.g., to be below a designated maximum string length), more than two buffers may be used. For instance, each time a chunk of the text document is received from disk, the chunk may be pushed directly to a buffer in the buffer array, and a node that points to the buffer can be created. FIG. 8 is an example code snippet 800 that captures this functionality in accordance with an embodiment.

Although line break positions are cached in every node using the modified piece table described above with reference to FIG. 8, it is not known which absolute line number is in which node. To obtain the content of a line, the nodes are traversed until the node containing the line is found. The time complexity of the worst case is O(N), where N is the count of the nodes. Caching the absolute line numbers in each node and using binary search on the list of nodes increases lookup speed. However, when a node is modified, all following nodes are visited to apply the line number delta. To achieve the same effect, a balanced binary tree may be leveraged.

A balanced binary tree may be used in combination with the modified piece table mentioned above to achieve a piece tree. By using the balanced binary tree, metadata that is related only to a tree node's subtree may be used to achieve a time complexity of O(log n). When a user edits text the metadata for the modified nodes may be recomputed, and the metadata change may be passed along the parent nodes all the way to the root node. If a Node has four properties (bufferIndex, start, length, and lineStarts), the result may be found in seconds. To increase the speed, the text length and the line break count of a node's left subtree may be stored. This may increase efficiency of searching by offset or line number from the root node of the tree. Storing metadata of the right subtree is the same, though it is unnecessary to cache the metadata for both the left subtree and the right subtree. FIG. 9 is an example code snippet 900 that shows the classes of the balanced binary tree in accordance with an embodiment. The balanced binary tree may be a red-black tree, though the scope of the example embodiments is not limited in this respect.

Figure 10:
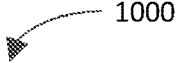

Assume for purposes of illustration that line break offsets are stored in each node of the balanced binary tree. Changing a node may necessitate updating the line break offsets. For instance, if a node includes 999 line breaks, the lineStarts array has 1000 elements. If the node is split evenly to create two nodes, each of the two nodes has an array containing 500 elements. Splitting the array into two nodes is more costly than merely moving pointers because we are not directly operating on a linear memory space. Fortunately, the line breaks within a buffer do not move because the buffers in the piece table are either read-only (original buffers) or append-only (changed buffers). Node may hold two references to the line break offsets on its corresponding buffer. Less modification results in faster, more efficient performance. FIG. 10 is an example code snippet 1000 that demonstrates the aforementioned functionality in accordance with an embodiment.

Figure 11:
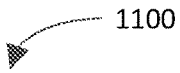
FIG. 11 depicts an example code snippet for creating a tree in accordance with an embodiment.

FIG. 11 depicts an example code snippet 1100 for creating a tree in accordance with an embodiment. The tree is described in the code snippet 1100 as having a root node, a left child node, and a right child node. For purposes of sharing the tree between threads, code snippet 1100 may be improved by using pointers in accordance with any of the example embodiments described herein.

FIG. 12 depicts an example code snippet 1200 for creating a tree using pointers in accordance with an embodiment. The tree is described in the code snippet 1200 as having a root node, a left child node, and a right child node. The code snippet 1200 includes comments 1202. The comments 1202 include a first portion 1202 defining a pointer to the root node, a second portion 1204 defining a pointer to the left child node, and a third portion 1206 defining a pointer to the right child node.

The code snippet 1200 further includes a first code portion 1214, a second code portion 1216, and a third code portion 1218. The first code portion 1214 points to the tree node. The second code portion 1216 points to the left child node. The third code portion 1218 points to the right child node.

The code snippet 1200 further includes comments 1210 and 1212, which show how a left tree and a right tree may be passed in.

The nodes of the tree may be stored in respective shared array buffers that are referenced by one or more memory pages. For example, the shared array buffers may be referenced by respective memory pages. In accordance with this example, a first memory page points to a first shared array buffer that stores a first node of the tree; a second memory page points to a second shared array buffer that stores a second node of the tree, and so on.

FIG. 13 depicts an example code snippet 1300 for getting the tree that is created by the code snippet 1200 of FIG. 12 in accordance with an embodiment. For instance, a main thread may run code snippet 1300 for purposes of sharing the tree with a worker thread. The code snippet 1300 includes a first function 1302, a second function 1304, and a third function 1306. The first function 1302 gets the root node using the pointer to the root node. The second function 1304 gets the left child node using the pointer to the left child node. The third function 1306 gets the right child node using the pointer to the right child node.

The code snippet 1300 defines the root node as node "a" at line 1308. The code snippet 1300 defines the left child node as node "b" at line 1310. The code snippet 1300 defines the right child node as node "c" at line 1312.

The code snippet 1300 includes a theoretical view 1314 of the tree, which is stored in the shared array buffer. The theoretical view 1314 includes lines 1316, 1318, and 1320. Line 1316 is returned by the first function 1302. Line 1318 is returned by the second function 1304. Line 1320 is returned by the third function 1306. In line 1316, "leftpointer" points to "leftdata" shown in line 1318, and "rightpointer" points to "rightdata" shown in line 1320.

FIG. 14 depicts another example code snippet 1400 for getting the tree in accordance with an embodiment. For instance, the worker thread may run code snippet 1400 to re-initialize the tree. By running code snippet 1400, the worker thread is able to identify the tree and to access content of the tree. Code snippet 1400 uses functions without using objects for illustrative purposes and is not meant to be limiting. It will be recognized that code snippet 1400 may use objects. For instance, code snippet 1400 may be modified to include either of the following lines to create a new class: "tree=newTreNode(ms.get(0));" or "tree=new TreeNode (0);"

FIGS. 11-14 are described with reference to trees for illustrative purposes and are not intended to be limiting. It will be recognized that the example techniques described herein are applicable to any suitable type of data structure.

Figure 15:
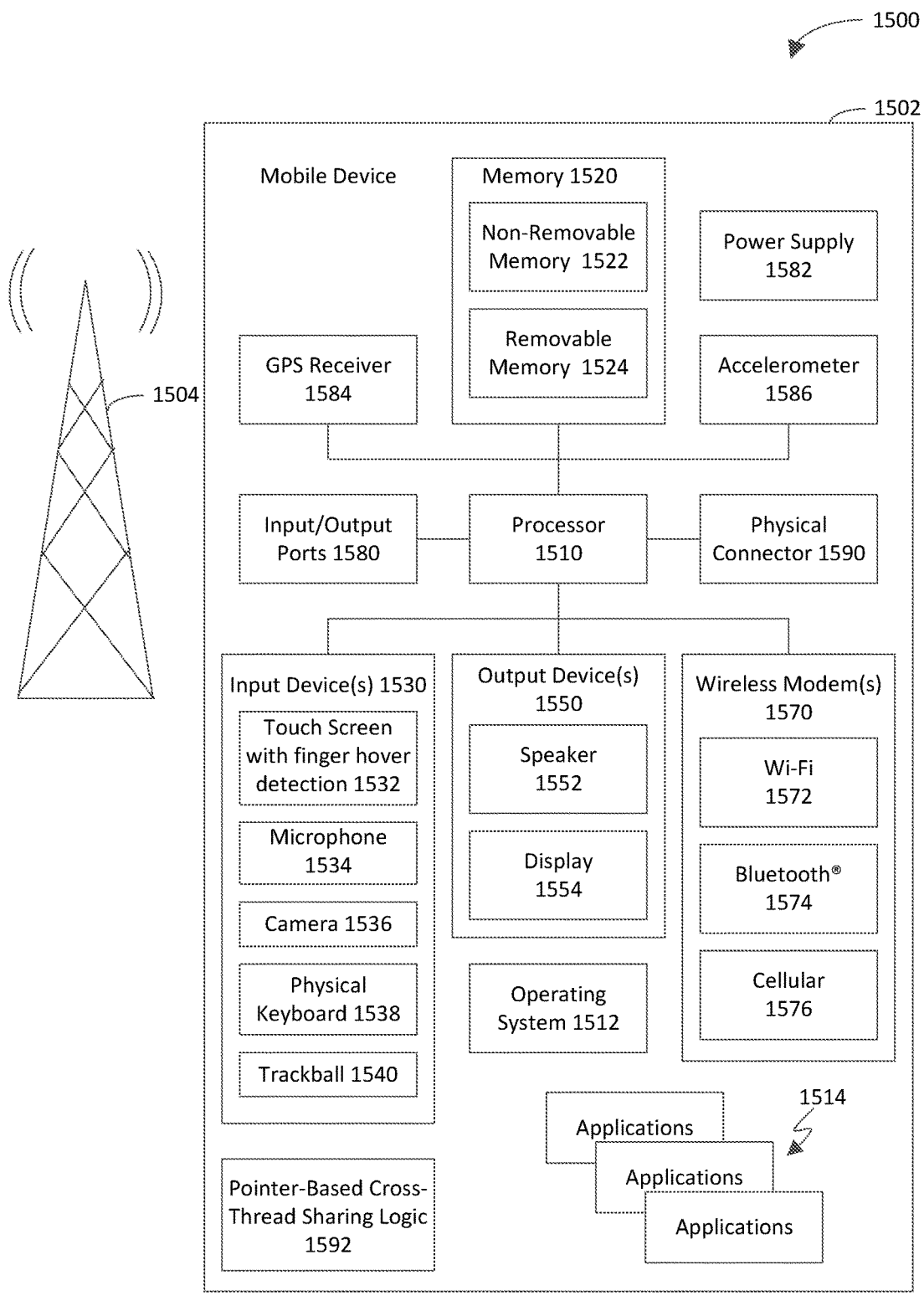
FIG. 15 is a system diagram of an example mobile device in accordance with an embodiment.

FIG. 15 is a system diagram of an example mobile device 1500 including a variety of optional hardware and software components, shown generally as 1502. Any components 1502 in the mobile device may communicate with any other component, though not all connections are shown, for ease of illustration. The mobile device 1500 may be any of a variety of computing devices (e.g., cell phone, smartphone, handheld computer, Personal Digital Assistant (PDA), etc.) and may allow wireless two-way communications with one or more mobile communications networks 1504, such as a cellular or satellite network, or with a local area or wide area network.

The mobile device 1500 includes a processor 1510 (e.g., signal processor, microprocessor, ASIC, or other control and processing logic circuitry) for performing such tasks as signal coding, data processing, input/output processing, power control, and/or other functions. An operating system 1512 may control the allocation and usage of the components 1502 and support for one or more applications 1514 (a.k.a. application programs). The applications 1514 may include common mobile computing applications (e.g., email applications, calendars, contact managers, web browsers, messaging applications) and any other computing applications (e.g., word processing applications, mapping applications, media player applications).

The mobile device 1500 includes pointer-based cross-thread sharing logic 1592, which is operable in a manner similar to the pointer-based cross-thread sharing logic 108 described above with reference to FIG. 1 and/or the instrument-based complexity detection logic 508 described above with reference to FIG. 5.

The mobile device 1500 includes memory 1520. The memory 1520 may include non-removable memory 1522 and/or removable memory 1524. The non-removable memory 1522 may include random access memory (RAM), read-only memory (ROM), flash memory, a hard disk, or other well-known memory storage technologies. The removable memory 1524 may include flash memory or a Subscriber Identity Module (SIM) card, which is well known in Global System for Mobile Communications (GSM) systems, or other well-known memory storage technologies, such as "smart cards." The memory 1520 may store data and/or code for running the operating system 1512, the applications 1514, and the pointer-based cross-thread sharing logic 1592. Example data may include web pages, text, images, sound files, video data, or other data sets to be sent to and/or received from one or more network servers or other devices via one or more wired or wireless networks. Memory 1520 may store a subscriber identifier, such as an International Mobile Subscriber Identity (IMSI), and an equipment identifier, such as an International Mobile Equipment Identifier (IMEI). Such identifiers may be transmitted to a network server to identify users and equipment.

The mobile device 1500 may support one or more input devices 1530, such as a touch screen 1532, microphone 1534, camera 1536, physical keyboard 1538 and/or trackball 1540 and one or more output devices 1550, such as a speaker 1552 and a display 1554. Touch screens, such as the touch screen 1532, may detect input in different ways. For example, capacitive touch screens detect touch input when an object (e.g., a fingertip) distorts or interrupts an electrical current running across the surface. As another example, touch screens may use optical sensors to detect touch input when beams from the optical sensors are interrupted. Physical contact with the surface of the screen is not necessary for input to be detected by some touch screens. For example, the touch screen 1532 may support a finger hover detection using capacitive sensing, as is well understood. Other detection techniques may be used, including camera-based detection and ultrasonic-based detection. To implement a finger hover, a user's finger is typically within a predetermined spaced distance above the touch screen, such as between 0.1 to 0.25 inches, or between 0.25 inches and 0.5 inches, or between 0.5 inches and 0.75 inches, or between 0.75 inches and 1 inch, or between 1 inch and 1.5 inches, etc.

Other possible output devices (not shown) may include piezoelectric or other haptic output devices. Some devices may serve more than one input/output function. For example, touch screen 1532 and display 1554 may be combined in a single input/output device. The input devices 1530 may include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1512 or applications 1514 may include speech-recognition software as part of a voice control interface that allows a user to operate the mobile device 1500 via voice commands. Furthermore, the mobile device 1500 may include input devices and software that allows for user interaction via a user's spatial gestures, such as detecting and interpreting gestures to provide input to a gaming application.

Wireless modem(s) 1570 may be coupled to antenna(s) (not shown) and may support two-way communications between the processor 1510 and external devices, as is well understood in the art. The modem(s) 1570 are shown generically and may include a cellular modem 1576 for communicating with the mobile communication network 1504 and/or other radio-based modems (e.g., Bluetooth® 1574 and/or Wi-Fi 1572). At least one of the wireless modem(s) 1570 is typically configured for communication with one or more cellular networks, such as a GSM network for data and voice communications within a single cellular network, between cellular networks, or between the mobile device and a public switched telephone network (PSTN).

The mobile device may further include at least one input/output port 1580, a power supply 1582, a satellite navigation system receiver 1584, such as a Global Positioning System (GPS) receiver, an accelerometer 1586, and/or a physical connector 1590, which may be a universal serial bus (USB) port, IEEE 1394 (FireWire) port, and/or RS-232 port. The illustrated components 1502 are not required or all-inclusive, as any components may be deleted and other components may be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the pointer-based cross-thread sharing logic 108 the pointer-based cross-thread sharing logic 508, the execution logic 532, the first creation logic 534, the second creation logic 536, the thread configuration logic 538, the change determination logic 540, the pointer management logic 542, the work logic 544, the memory system locking logic 546, flowchart 300, and/or flowchart 400 may be implemented in hardware, software, firmware, or any combination thereof.

For example, any one or more of the pointer-based cross-thread sharing logic 108 the pointer-based cross-thread sharing logic 508, the execution logic 532, the first creation logic 534, the second creation logic 536, the thread configuration logic 538, the change determination logic 540, the pointer management logic 542, the work logic 544, the memory system locking logic 546, flowchart 300, and/or flowchart 400 may be implemented, at least in part, as computer program code configured to be executed in one or more processors.

In another example, any one or more of the pointer-based cross-thread sharing logic 108 the pointer-based cross-thread sharing logic 508, the execution logic 532, the first creation logic 534, the second creation logic 536, the thread configuration logic 538, the change determination logic 540, the pointer management logic 542, the work logic 544, the memory system locking logic 546, flowchart 300, and/or flowchart 400 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 16:
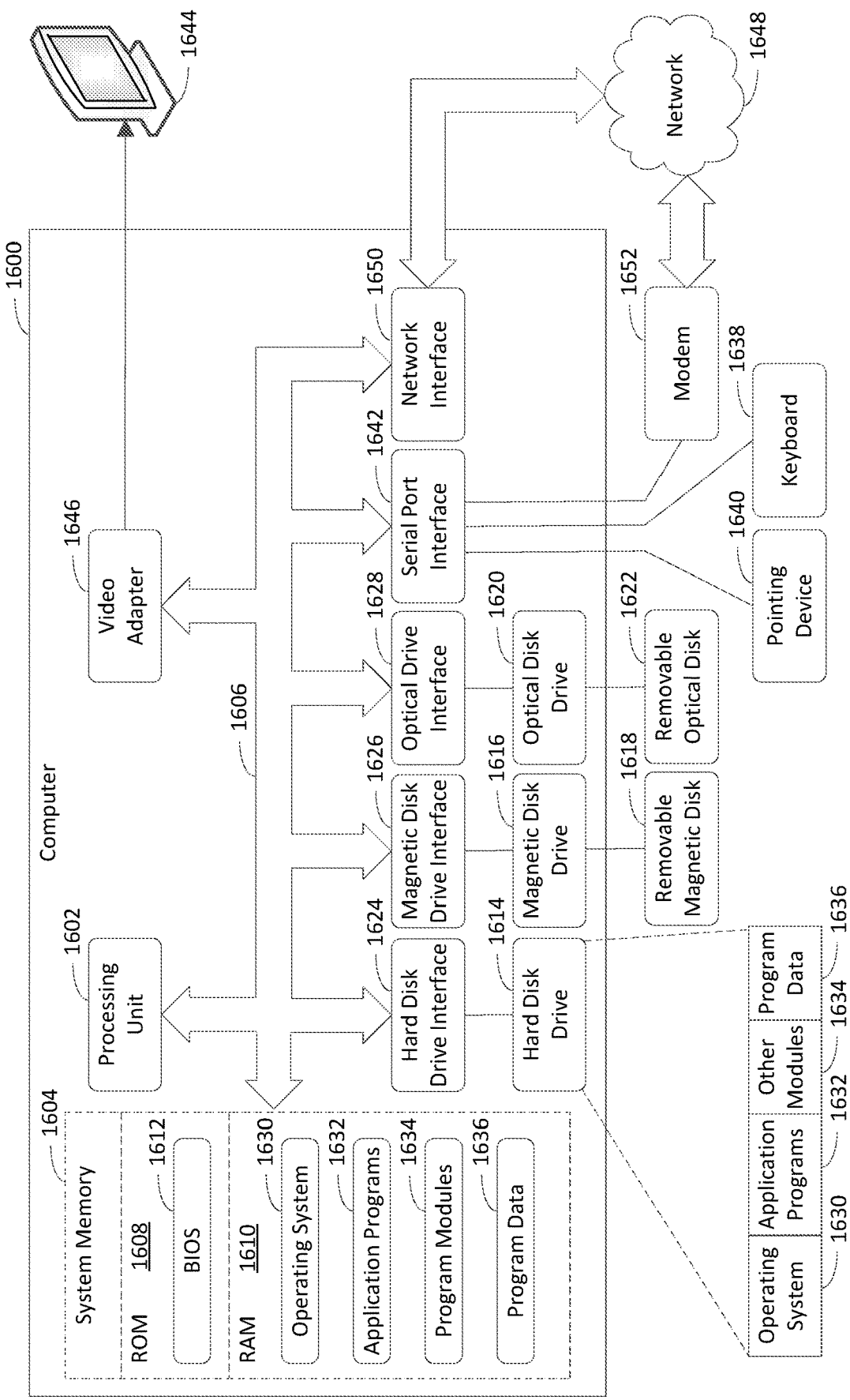
FIG. 16 depicts an example computer in which embodiments may be implemented.

II. Further Discussion of Some Example Embodiments (A1) An example system (FIG. 1, 102A-102M, 106A-106N; FIG. 5, 500; FIG. 15, 1502; FIG. 16, 1600) comprises memory (FIG. 15, 1520, 1522, 1524; FIG. 16, 1604, 1608, 1610) and a processing system (FIG. 15, 1510; FIG. 16, 1602) coupled to the memory. The processing system is configured to execute (FIG. 3, 302) a process (FIG. 2, 200; FIG. 5, 550), which includes a first thread (FIG. 2, 210; FIG. 5, 510) and a second thread (FIG. 2, 220; FIG. 5, 520). The processing system is further configured to create (FIG. 3, 304) a first memory system (FIG. 2, 212; FIG. 5, 512) associated with the first thread. The first memory system is configured to manage a first memory page (FIG. 2, 214; FIG. 5, 514) that points to a shared array buffer (FIG. 2, 230; FIG. 5, 530) that includes a data structure (FIG. 2, 260; FIG. 5, 560) stored in contiguous memory spaces. Instead of using the first memory system and the first memory page by the second thread, the processing system is further configured to create (FIG. 3, 306) a second memory system (FIG. 2, 222; FIG. 5, 522) associated with the second thread. The second memory system is configured to manage a second memory page (FIG. 2, 224; FIG. 5, 524) that points to the shared array buffer. The processing system is further configured to configure (FIG. 3, 308) the second thread to have access to the data structure in the shared array buffer by causing a pointer (FIG. 2, 216; FIG. 5, 516), which points to the data structure, and a size indicator (FIG. 2, 218; FIG. 5, 518), which indicates a size of the data structure, to be sent in lieu of the data structure from the first thread to the second thread. The data structure is capable of being changed without being re-arranged to be contiguous in memory.

(A2) In the example system of A1, wherein the processing system is configured to: execute the process, which includes the first thread and the second thread, in context of a web browser.

(A3) In the example system of any of A1-A2, wherein the processing system is configured to: execute the process, which includes the first thread and the second thread, in a node.js environment.

(A4) In the example system of any of A1-A3, wherein the pointer enables the second memory system associated with the second thread to locate an index on the second memory page, the index corresponding to the contiguous memory spaces in which the data structure is stored.

(A5) In the example system of any of A1-A4, wherein the shared array buffer includes a tree data structure stored in the contiguous memory spaces; and wherein the processing system is configured to: configure the second thread to have access to the tree data structure in the shared array buffer by causing the pointer, which points to the tree data structure, and the size indicator, which indicates the size of the tree data structure, to be sent in lieu of the tree data structure from the first thread to the second thread.

(A6) In the example system of any of A1-A5, wherein the shared array buffer includes a piece tree stored in the contiguous memory spaces; and wherein the processing system is configured to: configure the second thread to have access to the piece tree in the shared array buffer by causing the pointer, which points to the piece tree, and the size indicator, which indicates the size of the piece tree, to be sent in lieu of the piece tree from the first thread to the second thread.

(A7) In the example system of any of A1-A6, wherein the shared array buffer includes a linked list stored in the contiguous memory spaces; and wherein the processing system is configured to: configure the second thread to have access to the linked list in the shared array buffer by causing the pointer, which points to the linked list, and the size indicator, which indicates the size of the linked list, to be sent in lieu of the linked list from the first thread to the second thread.

(A8) In the example system of any of A1-A7, wherein the processing system is configured to: cause a plurality of pointers, which point to respective portions of the data structure, and a plurality of size indicators, which indicates a plurality of respective sizes of the plurality of respective portions of the data structure, to be sent in lieu of the data structure from the first thread to the second thread; determine that the first thread deletes an identified portion of the plurality of portions from the data structure; and based at least on a determination that the first thread deletes the identified portion of the data structure, delete an identified pointer, which points to the identified portion of the data structure, from the plurality of pointers.

(A9) In the example system of any of A1-A8, wherein the processing system is further configured to: determine that the first thread adds a string to the data structure in a memory space from which the identified portion of the data structure was deleted; and based at least on a determination that the first thread adds the string to the data structure in the memory space, generate a new pointer that points to the string in the memory space.

(A10) In the example system of any of A1-A9, wherein the contiguous memory spaces include first contiguous memory spaces followed by second contiguous memory spaces, the first contiguous memory spaces allocated for content of the data structure, the second contiguous memory spaces designated to store metadata associated with the data structure.

(A11) In the example system of any of A1-A10, wherein the contiguous memory spaces include first contiguous memory spaces followed by second contiguous memory spaces, the first contiguous memory spaces designated to store metadata associated with the data structure, the second contiguous memory spaces allocated for content of the data structure.

(A12) In the example system of any of A1-A11, wherein the processing system is configured to: create the first memory system as a first class in a JavaScript programming language; and create the second memory system as a second class in the JavaScript programming language.

(A13) In the example system of any of A1-A12, wherein the processing system is further configured to: cause a work request to be received at the second thread from the first thread, the work request requesting that the second thread perform work with regard to the data structure on behalf of the first thread; cause the work to be performed with regard to the data structure at the second thread on behalf of the first thread; and cause a result of the work to be provided from the second thread to the first thread.

(A14) In the example system of any of A1-A13, wherein the processing system is configured to: cause the data structure to be modified by the second thread on behalf of the first thread to provide a modified data structure; and cause a representation of the modified data structure to be provided from the second thread to the first thread.

(A15) In the example system of any of A1-A14, wherein the processing system is further configured to: lock the first memory system associated with the first thread; and cause the data structure to be modified by the second thread in response to the first memory system associated with the first thread being locked.

(A16) In the example system of any of A1-A15, wherein the processing system is configured to: cause an attribute of the data structure to be determined, based on an analysis of the data structure, by the second thread on behalf of the first thread; and cause information, which specifies the attribute of the data structure, to be provided from the second thread to the first thread.

(A17) In the example system of any of A1-A16, wherein the processing system is configured to: execute the process, which includes the first thread and the second thread, in an ECMAScript runtime.

(B1) An example method is implemented by a computing system (FIG. 1, 102A-102M, 106A-106N; FIG. 5, 500; FIG. 15, 1502; FIG. 16, 1600). The method comprises executing (FIG. 3, 302) a process (FIG. 2, 200; FIG. 5, 550), which includes a first thread (FIG. 2, 210; FIG. 5, 510) and a second thread (FIG. 2, 220; FIG. 5, 520). The method further comprises creating (FIG. 3, 304) a first memory system (FIG. 2, 212; FIG. 5, 512) associated with the first thread. The first memory system is configured to manage a first memory page (FIG. 2, 214; FIG. 5, 514) that points to a shared array buffer (FIG. 2, 230; FIG. 5, 530) that includes a data structure (FIG. 2, 260; FIG. 5, 560) stored in contiguous memory spaces. The method further comprises, instead of using the first memory system and the first memory page by the second thread, creating (FIG. 3, 306) a second memory system (FIG. 2, 222; FIG. 5, 522) associated with the second thread. The second memory system is configured to manage a second memory page (FIG. 2, 224; FIG. 5, 524) that points to the shared array buffer. The method further comprises configuring (FIG. 3, 308) the second thread to have access to the data structure in the shared array buffer by causing a pointer (FIG. 2, 216; FIG. 5, 516), which points to the data structure, and a size indicator (FIG. 2, 218; FIG. 5, 518), which indicates a size of the data structure, to be sent in lieu of the data structure from the first thread to the second thread. The data structure is capable of being changed without being re-arranged to be contiguous in memory.

(B2) In the method of B1, wherein executing the process comprises: executing the process, which includes the first thread and the second thread, in context of a web browser.

(B3) In the method of any of B1-B2, wherein executing the process comprises: executing the process, which includes the first thread and the second thread, in a node.js environment.

(B4) In the method of any of B1-B3, wherein the pointer enables the second memory system associated with the second thread to locate an index on the second memory page, the index corresponding to the contiguous memory spaces in which the data structure is stored.

(B5) In the method of any of B1-B4, wherein the shared array buffer includes a tree data structure stored in the contiguous memory spaces; and wherein configuring the second thread to have access to the data structure in the shared array buffer comprises: configuring the second thread to have access to the tree data structure in the shared array buffer by causing the pointer, which points to the tree data structure, and the size indicator, which indicates the size of the tree data structure, to be sent in lieu of the tree data structure from the first thread to the second thread.

(B6) In the method of any of B1-B5, wherein the shared array buffer includes a piece tree stored in the contiguous memory spaces; and wherein configuring the second thread to have access to the data structure in the shared array buffer comprises: configuring the second thread to have access to the piece tree in the shared array buffer by causing the pointer, which points to the piece tree, and the size indicator, which indicates the size of the piece tree, to be sent in lieu of the piece tree from the first thread to the second thread.

(B7) In the method of any of B1-B6, wherein the shared array buffer includes a linked list stored in the contiguous memory spaces; and wherein configuring the second thread to have access to the data structure in the shared array buffer comprises: configuring the second thread to have access to the linked list in the shared array buffer by causing the pointer, which points to the linked list, and the size indicator, which indicates the size of the linked list, to be sent in lieu of the linked list from the first thread to the second thread.

(B8) In the method of any of B1-B7, wherein configuring the second thread to have access to the data structure in the shared array buffer comprises: causing a plurality of pointers, which point to respective portions of the data structure, and a plurality of size indicators, which indicates a plurality of respective sizes of the plurality of respective portions of the data structure, to be sent in lieu of the data structure from the first thread to the second thread; and wherein the method further comprises: determining that the first thread deletes an identified portion of the plurality of portions from the data structure; and based at least on a determination that the first thread deletes the identified portion of the data structure, deleting an identified pointer, which points to the identified portion of the data structure, from the plurality of pointers.

(B9) In the method of any of B1-B8, further comprising: determining that the first thread adds a string to the data structure in a memory space from which the identified portion of the data structure was deleted; and based at least on a determination that the first thread adds the string to the data structure in the memory space, generating a new pointer that points to the string in the memory space.

(B10) In the method of any of B1-B9, wherein the contiguous memory spaces include first contiguous memory spaces followed by second contiguous memory spaces, the first contiguous memory spaces allocated for content of the data structure, the second contiguous memory spaces designated to store metadata associated with the data structure.

(B11) In the method of any of B1-B10, wherein the contiguous memory spaces include first contiguous memory spaces followed by second contiguous memory spaces, the first contiguous memory spaces designated to store metadata associated with the data structure, the second contiguous memory spaces allocated for content of the data structure.

(B12) In the method of any of B1-B11, wherein creating the first memory system comprises: creating the first memory system as a first class in a JavaScript programming language; and wherein creating the second memory system comprises: creating the second memory system as a second class in the JavaScript programming language.

(B13) In the method of any of B1-B12, further comprising: receiving a work request at the second thread from the first thread, the work request requesting that the second thread perform work with regard to the data structure on behalf of the first thread; performing the work with regard to the data structure at the second thread on behalf of the first thread; and providing a result of the work from the second thread to the first thread.

(B14) In the method of any of B1-B13, wherein performing the work comprises: modifying the data structure by the second thread on behalf of the first thread to provide a modified data structure; and wherein providing the result of the work comprises: providing a representation of the modified data structure from the second thread to the first thread.

(B15) In the method of any of B1-B14, further comprising: locking the first memory system associated with the first thread; wherein modifying the data structure by the second thread is performed in response to the first memory system associated with the first thread being locked.

(B16) In the method of any of B1-B15, wherein performing the work comprises: determining an attribute of the data structure at the second thread on behalf of the first thread by analyzing the data structure; and wherein providing the result of the work comprises: providing information, which specifies the attribute of the data structure, from the second thread to the first thread.

(B17) In the method of any of B1-B16, wherein executing the process comprises: executing the process, which includes the first thread and the second thread, in an ECMAScript runtime.

(C1) An example computer program product (FIG. 15, 1524; FIG. 16, 1618, 1622) comprising a computer-readable storage medium having instructions recorded thereon for enabling a processor-based system (FIG. 1, 102A-102M, 106A-106N; FIG. 5, 500; FIG. 15, 1502; FIG. 16, 1600) to perform operations. The operations comprise executing (FIG. 3, 302) a process (FIG. 2, 200; FIG. 5, 550), which includes a first thread (FIG. 2, 210; FIG. 5, 510) and a second thread (FIG. 2, 220; FIG. 5, 520). The operations further comprise creating (FIG. 3, 304) a first memory system (FIG. 2, 212; FIG. 5, 512) associated with the first thread. The first memory system is configured to manage a first memory page (FIG. 2, 214; FIG. 5, 514) that points to a shared array buffer (FIG. 2, 230; FIG. 5, 530) that includes a data structure (FIG. 2, 260; FIG. 5, 560) stored in contiguous memory spaces. The operations further comprise, instead of using the first memory system and the first memory page by the second thread, creating (FIG. 3, 306) a second memory system (FIG. 2, 222; FIG. 5, 522) associated with the second thread. The second memory system is configured to manage a second memory page (FIG. 2, 224; FIG. 5, 524) that points to the shared array buffer. The operations further comprise configuring (FIG. 3, 308) the second thread to have access to the data structure in the shared array buffer by causing a pointer (FIG. 2, 216; FIG. 5, 516), which points to the data structure, and a size indicator (FIG. 2, 218; FIG. 5, 518), which indicates a size of the data structure, to be sent in lieu of the data structure from the first thread to the second thread. The data structure is capable of being changed without being re-arranged to be contiguous in memory.

III. Example Computer System

FIG. 16 depicts an example computer 1600 in which embodiments may be implemented. Any one or more of the user devices 102A-102M and/or any one or more of the servers 106A-106N shown in FIG. 1 and/or computing system 500 shown in FIG. 5 may be implemented using computer 1600, including one or more features of computer 1600 and/or alternative features. Computer 1600 may be a general-purpose computing device in the form of a conventional personal computer, a mobile computer, or a workstation, for example, or computer 1600 may be a special purpose computing device. The description of computer 1600 provided herein is provided for purposes of illustration, and is not intended to be limiting. Embodiments may be implemented in further types of computer systems, as would be known to persons skilled in the relevant art(s).

As shown in FIG. 16, computer 1600 includes a processing unit 1602, a system memory 1604, and a bus 1606 that couples various system components including system memory 1604 to processing unit 1602. Bus 1606 represents one or more of any of several types of bus structures, including a memory bus or memory controller, a peripheral bus, an accelerated graphics port, and a processor or local bus using any of a variety of bus architectures. System memory 1604 includes read only memory (ROM) 1608 and random access memory (RAM) 1610. A basic input/output system 1612 (BIOS) is stored in ROM 1608.

Computer 1600 also has one or more of the following drives: a hard disk drive 1614 for reading from and writing to a hard disk, a magnetic disk drive 1616 for reading from or writing to a removable magnetic disk 1618, and an optical disk drive 1620 for reading from or writing to a removable optical disk 1622 such as a CD ROM, DVD ROM, or other optical media. Hard disk drive 1614, magnetic disk drive 1616, and optical disk drive 1620 are connected to bus 1606 by a hard disk drive interface 1624, a magnetic disk drive interface 1626, and an optical drive interface 1628, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1630, one or more application programs 1632, other program modules 1634, and program data 1636. Application programs 1632 or program modules 1634 may include, for example, computer program logic for implementing any one or more of (e.g., at least a portion of) the pointer-based cross-thread sharing logic 108 the pointer-based cross-thread sharing logic 508, the execution logic 532, the first creation logic 534, the second creation logic 536, the thread configuration logic 538, the change determination logic 540, the pointer management logic 542, the work logic 544, the memory system locking logic 546, flowchart 300 (including any step of flowchart 300), and/or flowchart 400 (including any step of flowchart 400), as described herein.

A user may enter commands and information into the computer 1600 through input devices such as keyboard 1638 and pointing device 1640. Other input devices (not shown) may include a microphone, joystick, game pad, satellite dish, scanner, touch screen, camera, accelerometer, gyroscope, or the like. These and other input devices are often connected to the processing unit 1602 through a serial port interface 1642 that is coupled to bus 1606, but may be connected by other interfaces, such as a parallel port, game port, or a universal serial bus (USB).

A display device 1644 (e.g., a monitor) is also connected to bus 1606 via an interface, such as a video adapter 1646.

In addition to display device 1644, computer 1600 may include other peripheral output devices (not shown) such as speakers and printers.

Computer 1600 is connected to a network 1648 (e.g., the Internet) through a network interface or adapter 1650, a modem 1652, or other means for establishing communications over the network. Modem 1652, which may be internal or external, is connected to bus 1606 via serial port interface 1642.

As used herein, the terms "computer program medium" and "computer-readable storage medium" are used to generally refer to media (e.g., non-transitory media) such as the hard disk associated with hard disk drive 1614, removable magnetic disk 1618, removable optical disk 1622, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1632 and other program modules 1634) may be stored on the hard disk, magnetic disk, optical disk, ROM, or RAM. Such computer programs may also be received via network interface 1650 or serial port interface 1642. Such computer programs, when executed or loaded by an application, enable computer 1600 to implement features of embodiments discussed herein. Accordingly, such computer programs represent controllers of the computer 1600.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

The foregoing detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:
    memory; and
    a processing system coupled to the memory, the processing system configured to:
        execute a process that includes a first thread and a second thread;
        create a first memory system associated with the first thread, the first memory system configured to manage a first memory page that points to a shared array buffer that includes a data structure stored in contiguous memory spaces;
        instead of using the first memory system and the first memory page by the second thread, create a second memory system associated with the second thread, the second memory system configured to manage a second memory page that points to the shared array buffer; and
        configure the second thread to have access to the data structure in the shared array buffer by causing a pointer, which points to the data structure, and a size indicator, which indicates a size of the data structure, to be sent in lieu of the data structure from the first thread to the second thread, wherein the data structure is capable of being changed without being re-arranged to be contiguous in memory.

2. The system of claim 1, wherein the pointer enables the second memory system associated with the second thread to locate an index on the second memory page, the index corresponding to the contiguous memory spaces in which the data structure is stored.

3. The system of claim 1, wherein the processing system is configured to:
    cause a plurality of pointers, which point to respective portions of the data structure, and a plurality of size indicators, which indicates a plurality of respective sizes of the plurality of respective portions of the data structure, to be sent in lieu of the data structure from the first thread to the second thread;

determine that the first thread deletes an identified portion of the plurality of portions from the data structure; and based at least on a determination that the first thread deletes the identified portion of the data structure, delete an identified pointer, which points to the identified portion of the data structure, from the plurality of pointers.

4. The system of claim 3, wherein the processing system is further configured to:

determine that the first thread adds a string to the data structure in a memory space from which the identified portion of the data structure was deleted; and based at least on a determination that the first thread adds the string to the data structure in the memory space, generate a new pointer that points to the string in the memory space.

5. The system of claim 1, wherein the contiguous memory spaces include first contiguous memory spaces followed by second contiguous memory spaces, the first contiguous memory spaces allocated for content of the data structure, the second contiguous memory spaces designated to store metadata associated with the data structure.

6. The system of claim 1, wherein the contiguous memory spaces include first contiguous memory spaces followed by second contiguous memory spaces, the first contiguous memory spaces designated to store metadata associated with the data structure, the second contiguous memory spaces allocated for content of the data structure.

7. The system of claim 1, wherein the processing system is configured to:

create the first memory system as a first class in a JavaScript programming language; and create the second memory system as a second class in the JavaScript programming language.

8. The system of claim 1, wherein the processing system is further configured to:

cause a work request to be received at the second thread from the first thread, the work request requesting that the second thread perform work with regard to the data structure on behalf of the first thread;

cause the work to be performed with regard to the data structure at the second thread on behalf of the first thread; and cause a result of the work to be provided from the second thread to the first thread.

9. The system of claim 8, wherein the processing system is configured to:

cause the data structure to be modified by the second thread on behalf of the first thread to provide a modified data structure; and cause a representation of the modified data structure to be provided from the second thread to the first thread.

10. The system of claim 9, wherein the processing system is further configured to:

lock the first memory system associated with the first thread; and cause the data structure to be modified by the second thread in response to the first memory system associated with the first thread being locked.

11. The system of claim 8, wherein the processing system is configured to:

cause an attribute of the data structure to be determined, based on an analysis of the data structure, by the second thread on behalf of the first thread; and cause information, which specifies the attribute of the data structure, to be provided from the second thread to the first thread.

12. A method implemented by a computing system, the method comprising:

executing a process that includes a first thread and a second thread;

creating a first memory system associated with the first thread, the first memory system configured to manage a first memory page that points to a shared array buffer that includes a data structure stored in contiguous memory spaces;

instead of using the first memory system and the first memory page by the second thread, creating a second memory system associated with the second thread, the second memory system configured to manage a second memory page that points to the shared array buffer; and configuring the second thread to have access to the data structure in the shared array buffer by causing a pointer, which points to the data structure, and a size indicator, which indicates a size of the data structure, to be sent in lieu of the data structure from the first thread to the second thread, wherein the data structure is capable of being changed without being re-arranged to be contiguous in memory.

13. The method of claim 12, wherein executing the process comprises:

executing the process, which includes the first thread and the second thread, in context of a web browser.

14. The method of claim 12, wherein executing the process comprises:

executing the process, which includes the first thread and the second thread, in a node.js environment.

15. The method of claim 12, wherein the shared array buffer includes a tree data structure stored in the contiguous memory spaces; and wherein configuring the second thread to have access to the data structure in the shared array buffer comprises:

configuring the second thread to have access to the tree data structure in the shared array buffer by causing the pointer, which points to the tree data structure, and the size indicator, which indicates the size of the tree data structure, to be sent in lieu of the tree data structure from the first thread to the second thread.

16. The method of claim 12, wherein the shared array buffer includes a piece tree stored in the contiguous memory spaces; and wherein configuring the second thread to have access to the data structure in the shared array buffer comprises:

configuring the second thread to have access to the piece tree in the shared array buffer by causing the pointer, which points to the piece tree, and the size indicator, which indicates the size of the piece tree, to be sent in lieu of the piece tree from the first thread to the second thread.

17. The method of claim 12, wherein the shared array buffer includes a linked list stored in the contiguous memory spaces; and wherein configuring the second thread to have access to the data structure in the shared array buffer comprises:

configuring the second thread to have access to the linked list in the shared array buffer by causing the pointer, which points to the linked list, and the size indicator, which indicates the size of the linked list, to be sent in lieu of the linked list from the first thread to the second thread.

18. The method of claim 12, further comprising:
receiving a work request at the second thread from the first thread, the work request requesting that the second thread perform work with regard to the data structure on behalf of the first thread;
performing the work with regard to the data structure at the second thread on behalf of the first thread; and
providing a result of the work from the second thread to the first thread.

19. The method of claim 12, wherein executing the process comprises:
executing the process, which includes the first thread and the second thread, in an ECMAScript runtime.

20. A computer program product comprising a computer-readable storage medium having instructions recorded thereon for enabling a processor-based system to perform operations, the operations comprising:
executing a process that includes a first thread and a second thread;
creating a first memory system associated with the first thread, the first memory system configured to manage a first memory page that points to a shared array buffer that includes a data structure stored in contiguous memory spaces;
instead of using the first memory system and the first memory page by the second thread, creating a second memory system associated with the second thread, the second memory system configured to manage a second memory page that points to the shared array buffer; and
configuring the second thread to have access to the data structure in the shared array buffer by causing a pointer, which points to the data structure, and a size indicator, which indicates a size of the data structure, to be sent in lieu of the data structure from the first thread to the second thread, wherein the data structure is capable of being changed without being re-arranged to be contiguous in memory.

* * * * *